United States Patent [19]

Gritter

[11] Patent Number: 5,537,308

[45] Date of Patent: Jul. 16, 1996

[54] DIGITAL CURRENT REGULATOR

[75] Inventor: David J. Gritter, Racine, Wis.

[73] Assignee: Eaton Corporation, Cleveland, Ohio

[21] Appl. No.: 137,502

[22] Filed: Oct. 15, 1993

[51] Int. Cl.[6] .......................... H02M 7/529; H02M 7/539
[52] U.S. Cl. ................................................ 363/95; 363/37
[58] Field of Search .................................. 363/34, 36, 37, 363/95, 96, 98, 132, 137

[56] References Cited

U.S. PATENT DOCUMENTS

| | | | |
|---|---|---|---|
| 4,371,824 | 1/1983 | Gritter | 363/134 |
| 4,581,569 | 4/1986 | Fujioka et al. | 318/811 |
| 4,823,251 | 4/1989 | Kawabata et al. | 363/95 |
| 4,958,117 | 9/1990 | Kerkman et al. | 363/37 |
| 4,958,269 | 9/1990 | Gritter | 318/801 |
| 4,990,844 | 2/1991 | Gritter et al. | 318/757 |
| 4,994,950 | 2/1991 | Gritter | 363/98 |
| 5,045,988 | 9/1991 | Gritter et al. | 363/35 |
| 5,091,842 | 2/1992 | Kawai | 363/98 |
| 5,123,746 | 6/1992 | Okado | 363/37 |
| 5,151,853 | 9/1992 | Tatara et al. | 363/37 |
| 5,177,678 | 1/1993 | Ibori et al. | 363/98 |
| 5,182,701 | 1/1993 | Mochikawa et al. | 363/95 |
| 5,329,221 | 7/1994 | Schavder | 363/97 |
| 5,400,240 | 3/1995 | Araki | 363/97 |
| 5,407,027 | 4/1995 | Suzuki et al. | 363/35 |

FOREIGN PATENT DOCUMENTS

| | | | |
|---|---|---|---|
| 0191870 | 8/1985 | European Pat. Off. | H02P 5/41 |
| 2059651 | 9/1980 | United Kingdom | H02P 13/16 |
| 2243464 | 3/1991 | United Kingdom | H02P 7/62 |
| 2098369 | 5/1992 | United Kingdom | H02P 7/36 |

OTHER PUBLICATIONS

"Introduction to Field Orientation and High Performance AC Drives", Coeditors D. W. Novotny and R. D. Lorenz, Presented Oct. 6–7 at the 1985 IEEE Industry Applications Society Annual Meeting, Toronto, Canada.
"A Stator Flux Oriented Induction Machine Drive", Xingyi Xu et al, WEMPEC Research Report Feb. 88.
"A Low Cost Stator Flux Oriented Voltage Source Variable Speed Drive", Y. Xue et al, Dec. 1990 IEEE–IAS Annual Meeting Record, pp. 410–415.
"Adjustable Frequency AC Drives Application Guide", Eaton Corporation, Application Notes 53–4032–R, Oct. 1992.
"Adjustable Frequency AC Drives Application Guide", Eaton Corporation, Application Notes 53–4032–H, Nov. 1992.
"Electric Drive Applications Guide", Dynamatic, Rev. Dec. 1992 Ed., pp. 1–65.

*Primary Examiner*—Jeffrey L. Sterrett
*Attorney, Agent, or Firm*—Andrus, Sceales, Starke & Sawall

[57] ABSTRACT

A method and a device for regulating current from an inverter supplying three-phase excitation signals to an induction motor. Two of the three phase currents are converted to digital signals which are sent to a microprocessor. The microprocessor converts the digital signals into a waveform angle signal and a waveform modulation constant signal. The switching signals for the inverter are generated in response to the waveform angle signal and the waveform modulation constant signal.

30 Claims, 5 Drawing Sheets

DIGITAL CURRENT REGULATOR

BACKGROUND AND SUMMARY OF THE INVENTION

This invention relates to AC drives and, in particular, to a device and method for regulating the current supplied by an inverter to an induction motor in response to switching signals from a waveform generator.

Given that motor curlrents must be accurately controlled to eliminate the risk of inverter trips, it is necessary to eliminate or reduce the disadvantages of current control. These disadvantages include the need for more voltage headroom on the inverter bus, less than optimum inverter switching signals, poorly defined switching frequency, and significant errors in current regulation at high stator frequencies.

There are several basic approaches to current control. Control of current in the stationary reference frame using bang-bang control or triangular modulated control is the most common. The characteristics of these regulators have been studied and they are known to require a great deal of voltage headroom and to result in large current errors under some circumstances.

The next level of control is to regulate the currents in either a stationary or synchronous reference frame by taking into account that only seven discrete voltage vectors can be applied to a motor. At each sample interval, a new voltage vector is chosen based on the present current error and an estimate of back EMF. In general, these schemes require some sort of comparator which chooses different voltage vectors under rapidly changing dynamic conditions than the voltage vectors which would be chosen to correct only small current errors. In this way, the available inverter switching frequency is better utilized. However, these schemes are subject to loss of current control if orientation is lost.

For optimum current control, a current regulator is provided to generate voltage magnitude and phase information which is supplied to a conventional voltage mode PWM waveform generator which chooses multiple voltage vectors to generate the required average voltage. This technique provides optimum inverter gating signals. When combined with a digital control system so that the regulated current reaches its set point in one sample time, the current regulator provides excellent dynamic current control without the need for a large voltage headroom. Limiting of the demanded motor voltage based on the known constraints of the available inverter bus voltage and the PWM waveform modulation index provides a further decrease in the necessary headroom.

BRIEF DESCRIPTION OF THE DRAWINGS

The drawings illustrate the best mode presently contemplated for carrying out the invention.

DETAILED DESCRIPTION OF THE PREFERRED EMBODIMENT

This invention relates to AC drives and, in particular, to a device and method for regulating the current supplied by an inverter to an induction motor in response to switching signals from a waveform generator.

Figure 1:
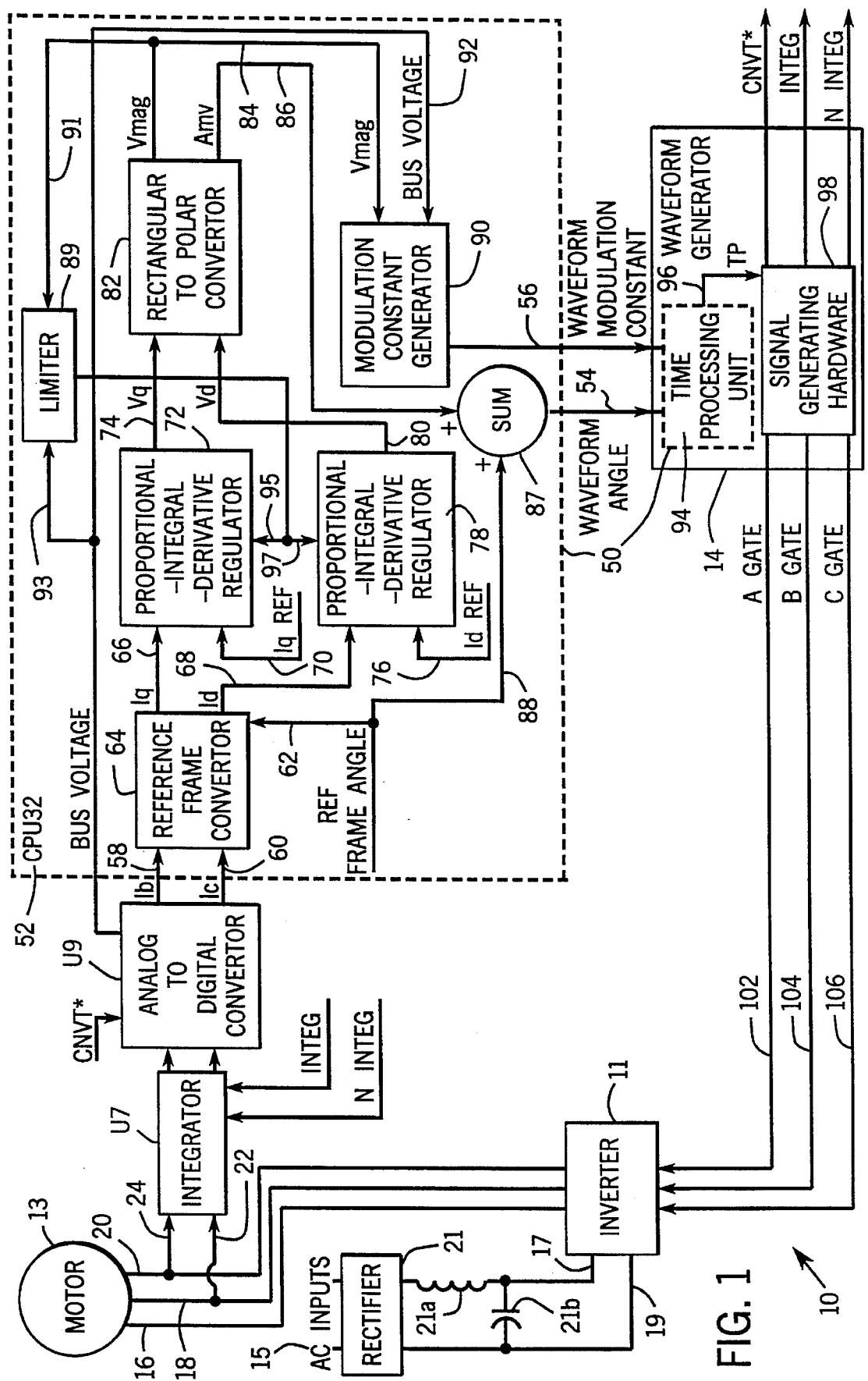
FIG. 1 is a block diagram of an AC drive incorporating the digital current regulator of this invention.

FIG. 1 is a block diagram of the AC drive, generally designated by the reference numeral 10, for use in conjunction with this invention. The AC drive 10 is comprised of an inverter 11, a waveform generator 14, and an AC motor 13. The AC drive system 10 converts three-phase, 60 hertz input power, 15, to an adjustable frequency and voltage source for controlling the speed of the AC motor 13. Bus lines 16, 18, and 20 interconnect the motor 13 and the inverter 11.

The AC input power, 15, is converted to a DC bus voltage across lines 17 and 19 by rectifier 21. The voltage across lines 17 and 19 is inputted into inverter 11. Inductor 21a and capacitor 21b filter the bus voltage from rectifier 21.

Figure 2A:
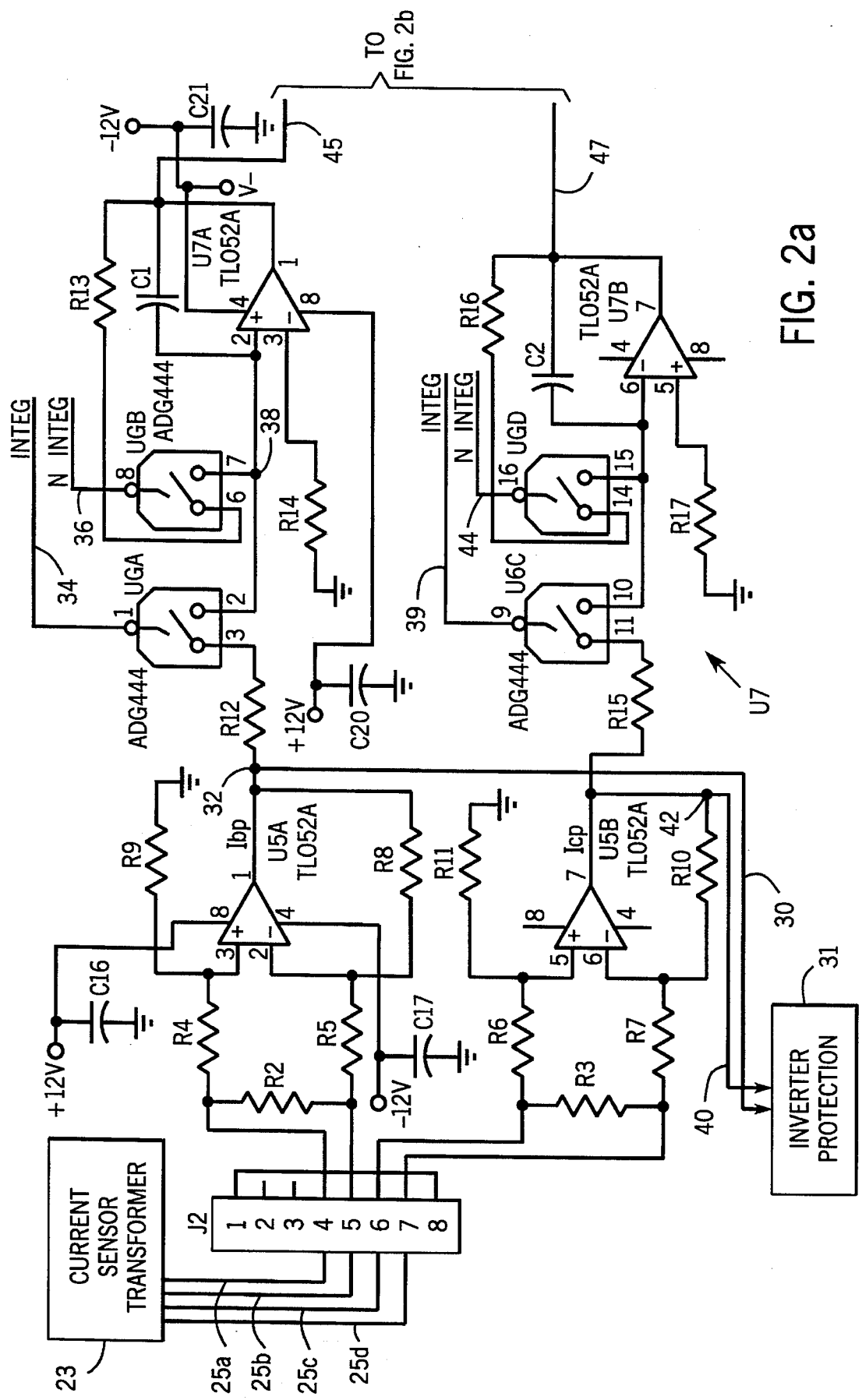
FIG. 2a is an electric schematic of an integrator shown in FIG. 1.

Current feedback, lines 22, 24, of two motor currents is required for the instantaneous current regulator. The electrical schematic of the current sensor and the integrator is shown in FIG. 2a.

The output values of the integrator, U7, are the average analog values of the current feedback of two motor currents for the first half of a carrier cycle. The carrier cycle is defined as the period of the reciprocal of the switching frequency of the inverter.

Upon receiving a sample signal, CNVT★, from the waveform generator 14, the analog to digital converter, U9, converts the analog current feedback signals to digital current feedback signals, Ib and Ic. In addition, the analog to digital converter, U9, generates a digital bus voltage signal.

The digital current feedback signals, and the digital bus voltage signal are input into a microcontroller, 50, incorporating a CPU32 core, 52. The CPU32 core, 52, generates a space vector waveform angle, line 54, and a modulation constant, line 56. The space vector waveform angle, line 54, and the modulation constant, line 56, are sent to a time processing unit, 94, incorporated in the microcontroller, 50. The time processing unit, 94, is programmed to generate the timing signals necessary to implement a space vector PWM waveform algorithm. The PWM waveform algorithm provides lower current ripple and better utilization of available inverter bus voltage than do alternative PWM waveforms.

Referring to FIG. 2a, a current sensor transformer 23 is provided. As is known, the current sensor transformer, 23, senses the phase currents on lines 18 and 20 from inverter 11 to motor 13. Current sensor transformer 23 provides a first phase current, line 25a, to pin 4 of a current sensor header, J2. The first phase current passes through a burden resistor, R2, and continues out pin 5 of header J2 back to the current sensor transformer 23 on line 25b.

The current sensor transformer 23 provides a second phase current on line 25c to pin 6 of current sensor header J2. The second phase current passes through a burden resistor, R3, and continues out pin 7 of header J2 on line 25d to the current sensor transformer 23.

A commercially available integrated circuit chip, TL052A, having two differential amplifiers, U5A and U5B, is provided. A positive twelve volt power supply is connected to pin 8 of the TL052A chip. A capacitor, C16, decouples the positive twelve volt power supply. A negative twelve volt power supply is connected to pin 4 of the TL052A chip. A capacitor, C17, decouples the negative twelve volt power supply.

An amplifier circuit is formed with resistors R4, R5, R8, and R9 in conjunction with differential amplifier U5A in order to amplify the voltage across burden resistor R2. Likewise, a second amplifier circuit is formed with resistors R6, R7, Ri0 and R11 in conjunction with differential amplifier U5B in order to amplify the voltage across burden resistor R3.

The output of differential amplifier U5A, pin 1 of the TL052A chip, is a first phase current signal, Ibp. The output of differential amplifier U5B, pin 7 of the TL052A chip, is a second phase current signal, Icp.

An ADG444 commercially available integrated circuit chip, having four switches, U6A, U6B, U6C, and U6D, is provided. Pin 1 of the TL052A chip is connected to pin 3 of switch U6A of chip ADG444 through resistor R12. Line 30 interconnects an inverter protection circuit, 31, which is known, to pin 1 of the TL052A chip at node 32.

Pin 1 on switch U6A is connected to receive an integrate signal, INTEG, line 34. Pin 2 on switch U6A is connected to pin 2 on a differential amplifier, U7A. Pin 6 on switch U6B is connected to pin 1 on differential amplifier U7A through resistor R13. Pin 7 of switch U6B is connected to pin 2 of differential amplifier U7A at junction 38. Pin 8 on switch U6B is connected to receive a reset signal, N INTEG, line 36.

Pin 9 of switch U6C is connected to receive an integrate signal, INTEG, line 39. Pin 7 on differential amplifier U5B is connected to pin 11 of switch U6C through resistor R15. Line 40 interconnects inverter protection circuit 31 and pin 7 of differential amplifier U5B at junction 42. Pin 10 of switch U6C is connected to pin 6 on differential amplifier U7B.

Pin 16 of switch U6D is connected to receive a reset signal, N INTEG, line 44. Pin 15 of switch U6D is connected to pin 10 on switch U6C and to pin 6 on a differential amplifier, U7B. Pin 14 on switch U6D is connected to pin 7 on differential amplifier U7B. Capacitor C2 interconnects pin 6 on differential amplifier U7B and pin 7 on differential amplifier U7B. Pin 5 is connected to ground through resistor R17.

Differential amplifiers U7A and U7B comprise an integrated circuit. The integrated circuit is commercially available under the part number TL052A.

Figure 2B:
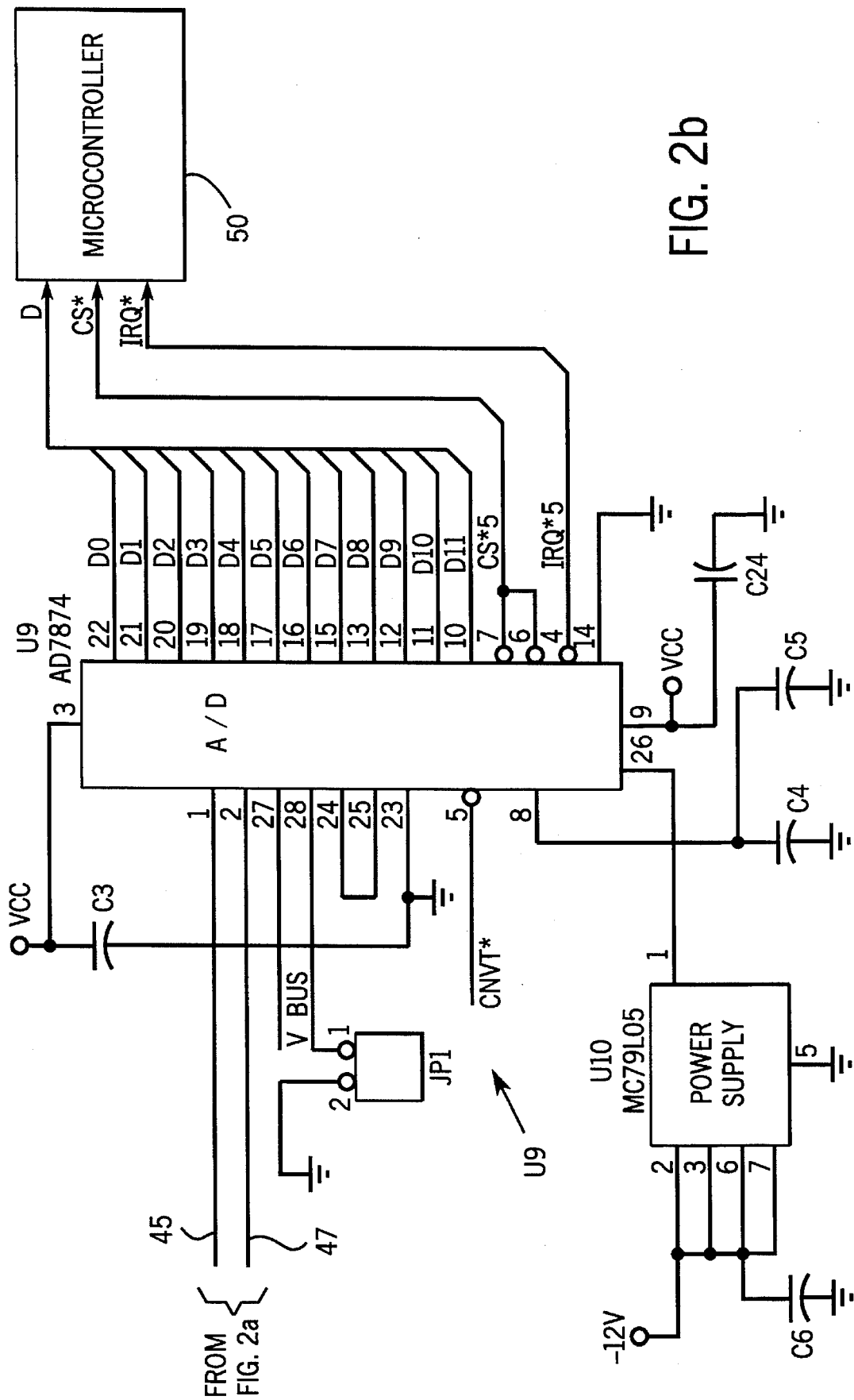
FIG. 2b is an electric schematic of an analog to digital converter shown in FIG. 1.

Referring to FIG. 2b, a commercially available analog to digital converter, U9, available under the part number AD7874, is provided. Pin. 1, FIG. 2b, on the analog to digital converter, U9, is interconnected to pin 1 on differential amplifier U7A, FIG. 2a, by line 45. Pin 2, FIG. 2b, on analog to digital converter U9 is connected to pin 7 of differential amplifier U7B, FIG. 2a, by line 47. Pin 3 of analogto digital converter U9 is connected to a five volt power source, VCC. The five volt power source, VCC, is connected to ground through capacitors C3 and C24. Pin 9 of analog to digital converter U9 is also connected to the five volt power source, VCC. Pins 23 and 14 of analog to digital converter U9 are grounded.

Pin 8 of analog to digital converter U9 is connected to pin 1 of a commercially available negative five volt power supply, MC79L05, U10. Pin 1 of power supply U10 is also connected to pin 26 of analog to digital converter U9 and to ground through capacitors C4 and C5. Pins 2, 3, 6 and 7 of negative power supply U10 are connected to a negative twelve volt power source. In addition, pins 2, 3, 6, and 7 are connected to ground through capacitor C6. Pin 5 of power supply U10 is connected to ground.

Pins 24 and 25 of analog to digital converter U9 are tied together. Pin 28 of analog to digital converter U9 is connected to pin 1 on header component JP1. Pin 2 on header component JP1 is grounded. Known circuitry within the AC drive 10 senses the bus voltage from the inverter 11 to the motor 13 and provides the value of the bus voltage with respect to ground to header component JP1 such that header component JP1 may sense the value of the bus voltage.

Pins 10–13 and 15–22 on analog to digital converter U9 are connected to lines D0–D11 of a bus line, D. Pins 6 and 7 of analog to digital converter U9 are connected to line CS★5 of a bus line, CS★, and pin 4 of analog to digital converter U9 is connected to line IRQ★5 of a bus line, IRQ★. Pin 5 of analog to digital converter U9 is connected to receive a sample signal, CNVT★.

Bus lines D, CS★, and IRQ★, connect to a commercially available MC68332 microcontroller, 50. The microcontroller 50, FIG. 1, incorporates a CPU32 core, 52, which is programmed to implement the current regulator of the invention. The CPU32 core accepts the bus voltage and the motor current feedback from bus lines D and CS★, FIG. 2b, and generates a space vector waveform angle, line 54, and a modulation constant, line 56. The space vector waveform angle, line 54, and the modulation constant, line 56, are sent to a time processing unit, 94, incorporated in the MC68332, 50. The MC68332 time processing unit, 94, is programmed to generate the timing signals necessary to implement a space vector PWM waveform algorithm. The timing signals are sent to programmable logic arrays U8 and U19, FIG. 3, on bus line TP, 96. The programmable logic arrays, U8 and U9, are commercially available under part number 22V10.

Figure 3:
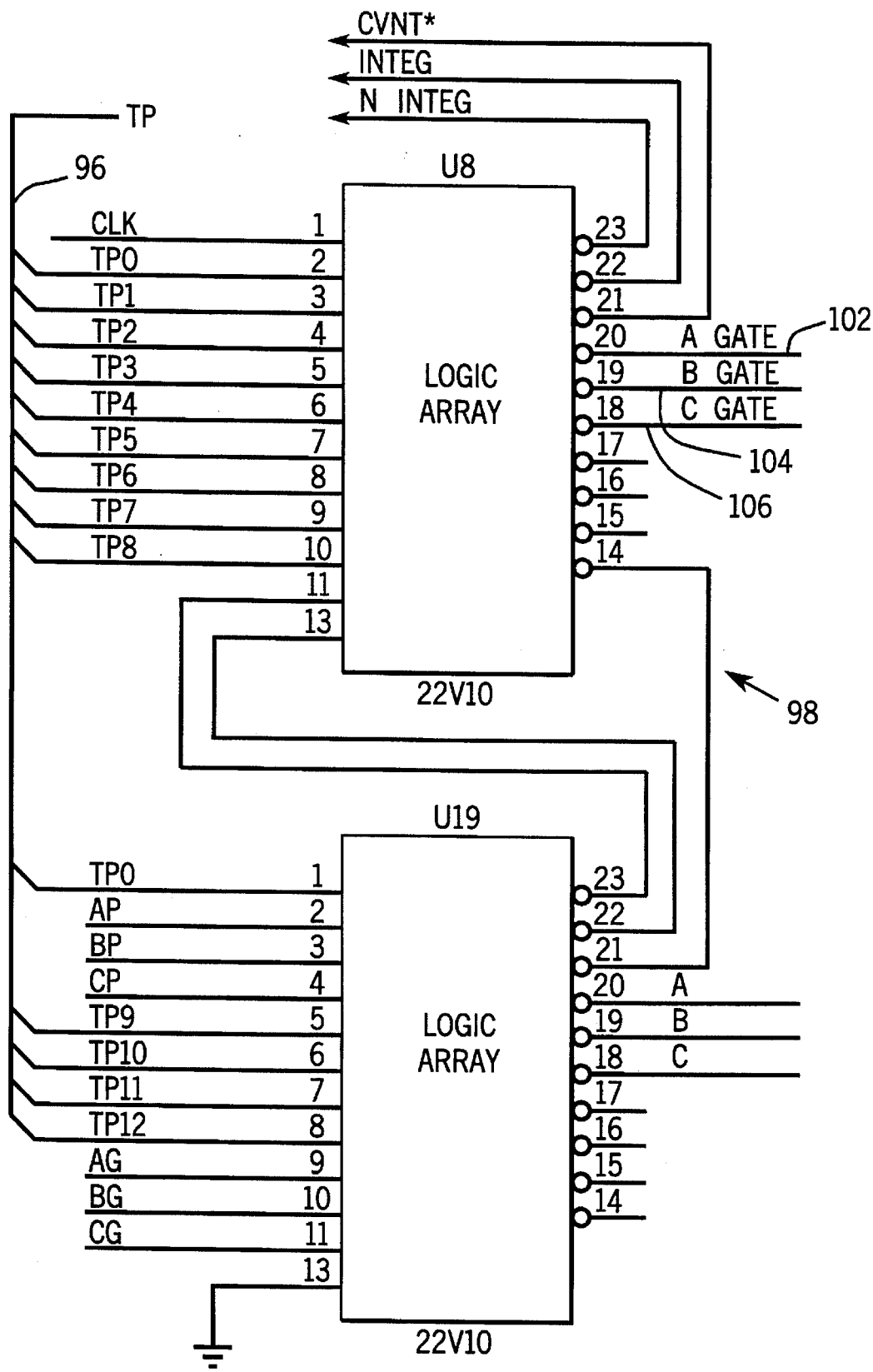
FIG. 3 is an electrical schematic of the signal generating hardware of a waveform generator shown in FIG. 1.

Referring to FIG. 3, pins 2–10 of programmable logic array U8 are connected to lines TP0–TP8 of bus line TP. Pins 11 and 13 of programmable logic array U8 are connected to pins 23 and 22, respectively, of programmable logic array U19. Pin 1 of programmable logic array U19 is connected to line TP0 of bus line TP. Pins 5, 6, 7 and 8 of programmable logic array U19 are connected to lines TP9, TP10, TP11, and TP12, respectively. Pin 21 of programmable logic array U19 is connected to pin 14 of programmable logic array U8.

Upon receiving the timing signals on bus line TP, switching signals, A gate, B gate and C gate on lines 102, 104 and 106, respectively, are generated by programmable logic array U8. In addition, programmable logic array U8 generates the above noted integrate signal, INTEG, the reset signal, N INTEG, and the sample signal, CNVT★.

In operation, current feedback is accepted by current sensor transformer 23, FIG. 2a, from two of the three motor signal phases from the inverter 11 to the motor 13. The first phase current is processed through differential amplifier U5A in order to amplify the signal, Ibp. Similarly, the second phase current is processed through differential amplifier U5B in order to amplify the signal, Icp.

Because the signal from the inverter 11 to the motor 13 employs three different voltages to synthesize the required instantaneous voltage, the phase current signals, Ibp and Icp, will rise or fall at three different rates during the carrier cycle. Therefore, the instantaneous current at a given point in a carrier cycle will not be an accurate representation of the fundamental component of current which the regulators are supposed to be controlling. However, the fundamental component of current may be calculated based on the following conditions or assumptions.

1. The motor back EMF or speed voltage is not changed significantly during a carrier cycle;

2. The second half of the carrier cycle applies the same average voltage to the motor as the first; and 3. The average current during the first half of the carrier cycle may be sampled or calculated.

The average current during the first half of the cycle is calculated by integrating the current during this half cycle and dividing by one half of the carrier period.

The output of differential amplifiers U5A and U5B are inputted into analog switches U6A and U6C, FIG. 2a, respectively. Analog switches U6A and U6C are used to apply phase current signals, Ibp and Icp, to integrators U7A and U7B. Analog switches U6B and U6D reset the integrators U7A and U7B in response to a reset signal, N INTEG, at lines 36 and 44 after the phase current signals, Ibp and Icp, are sampled by analog to digital converter U9, FIG. 2b, in response to a sample signal, CNVT★, at pin 5.

Upon an integrate signal, INTEG, at lines 34 and 39, integrators U7A and U7B begin to integrate phase current signals, Ibp and Icp, respectively. At approximately the end of one-half of the carrier period, the waveform generator, 14, FIG. 1, sends the sample signal, CNVT★, to pin 5 of the analog to digital converter, U9, FIG. 2b. Upon sending the sample signal, CNVT★, the waveform generator, 14, ceases to send the integrate signal, INTEG, thereby opening analog switches U6A and U6C. Because switches U6A and U6C are open, integrators U7A and U7B are in a hold mode, so the output levels at pin 1 of integrator U7A and at pin 7 of integrator U7B remain constant.

Upon receiving the sample signal, CNVT★, the analog to digital converter U9 converts the integrator U7A output at pin 1, the integrator U7B output at pin 2, and the bus voltage at pin 28 into a digital signal at pins 10–13 and 15–22 of the analog to digital converter, U9. This digital signal, representing the phase current signals, Ibp and Icp, and the bus voltage, is transferred to the microprocessor 50, FIG. 1, on lines D0–D11 of bus line D in response to an interrupt signal sent on line IRQ★5 of bus line IRQ★ to signify that the analog to digital conversion is complete. When microprocessor 50 receives the interrupt signal, line IRQ★5, it generates a reset signal, N INTEG, at lines 36 and 44 which opens analog switches U6B and U6D and resets integrators U7A and U7B.

Referring now to FIG. 1, the digital current signals representing phase current signals, Ibp, Icp, on bus line D are shown as Ib, line 58, and Ic, line 60. Digital current signal Ib, line 58, digital current signal Ic, line 60, and reference frame angle, line 62, are input into a reference frame converter 64.

As is known, a three-phase motor may be mathematically represented as a two-phase motor having two axes of magnetic symmetry. The axis in which the magnetic flux is generated is known as the direct axis. The axis perpendicular to the direct axis is known as the quadrature axis. These expressions, direct axis and quadrature axis, are normally shortened to D-axis and Q-axis.

Using the two digital currents, Ib at line 58 and Ic at line 60, and the reference frame angle, line 62, the reference frame converter calculates the quadrature axis current, Iq, line 66, and the direct axis current signal, Id, line 68. The Q-axis current signal, line 66, and a Q-axis current reference signal, Iq ref, line 70, are inputted into a proportional-integral-derivative regulator 72.

As is known, a proportional-integral-derivative regulator takes the difference of the inputs and generates an error signal which is a linear function of the inputs. This error signal is input into the integral portion of the regulator which, in turn, generates a second signal which is proportional to the time integral of its input. The second signal and the error signal are multiplied by separately adjustable gains and the results summed.

The derivative portion of the regulator takes the difference between the previous input signal to the regulator and the present input signal to the regulator and multiplies the difference by an independently adjustable gain. The output of the proportional-integral-derivative regulator is obtained by summing the output of the derivative portion of the regulator with the previously obtained sum generated from the second signal and the error signal. The output of proportional regulator 72 is the Q-axis voltage signal, vq, line 74. A digital control system is incorporated into the conventional proportional-integral-derivative regulator, 72, so that the current regulated reaches its set point in one sample time. This is known as a deadbeat controller.

A first order model of a motor from the point of view of the current regulator consists of a simple R-L (Resistance-Inductance) series circuit. At typical carrier frequencies and for current step changes approximating the rated magnetizing current of the motor, the resistive term becomes insignificant.

A deadbeat controller for motor current may be implemented if the inductance is known. For a step current change, $\Delta I$, and a sample time, T, an applied voltage, $L\Delta I/T$, applied for one sample time will cause the motor current to exactly reach its set point. Thus, a proportional gain term of $L/T$ will prove to be the optimal regulator gain.

The deadbeat concept can be incorporated into a conventional proportional-integral-derivative regulator by using the calculated gain as the proportional gain. The integral gain is then chosen to adequately compensate for errors which are introduced by the resistance and any back EMF terms. The derivative term is used to estimate the average feedback current during the entire carrier cycle based on the average current sampled in the previous and the present sample times.

The current regulator can be self-tuning by applying a known voltage significantly greater than the expected IR drop to the motor for one sample time and observing a change in current. The subtransient inductance of the motor can then be calculated. This value may be used in other calculations or adaptive regulators, particularly, in estimating rotor time constant or flux level in field orientation algorithms.

The D-axis current signal, line 68, FIG. 1, and a D-axis current reference signal, Id ref, line 76, are inputted into proportional-integral-derivative regulator 78. The output of proportional-integral-derivative regulator 78 is the direct axis voltage signal, Vd, line 80. A digital control system is also incorporated into proportional-integral-derivative regulator 78.

The Q-axis voltage signal, line 74, and the D-axis voltage signal, line 80, are inputted into a rectangular to polar converter 82. The rectangular to polar converter, 82, converts the Q-axis voltage signal, line 74, and a D-axis voltage signal, line 80, from rectangular coordinates to polar coordinates. The output of rectangular polar converter 82 is a voltage magnitude signal, Vmag, line 84, and a voltage angle signal, Amv, line 86.

The reference frame angle, line 88, is added at summer 87 to the voltage magnitude angle signal, line 86, to produce the space vector waveform angle, line 54. The voltage magnitude signal, line 84, is fed into a modulation constant generator, 90. The modulation constant generator, 90, divides the voltage magnitude signal, line 84, by the bus voltage, line 92, to produce the modulation constant, line 56.

It is important to utilize as much of the inverter's voltage capability as possible. The excitation signals from the inverter to the motor experience saturation characteristics at modulation constants above 1.0. As a result, stable operation at high output voltages requires that the integrators in the current regulators be clamped. The integrators in the regulators, 72 and 78, are clamped by a signal, lines 95 and 97, respectively, from a limiter 89. The limiter 89 observes the voltage magnitude signal, line 91, and the bus voltage, line 93, and generates the signal, lines 95 and 97, to clamp the regulator outputs in proportion so that the integrators demand the maximum allowed voltage magnitude without-varying the voltage angle signal. Clamping adjusts the integrator value so that transient conditions caused by integrator overshoot are avoided.

The clamping level is based on the bus voltage feedback, line 93, and is set to allow a 3–5% inverter headroom. The levels to which the separate integrators are clamped are based on their proportional contribution to the voltage magnitude, i.e., after the clamping action, the voltage magnitude is reduced, but the voltage angle signal remains the same.

The waveform angle, line 54, and the waveform modulation constant, line 56, are inputted into the time processing unit, 94, of the microprocessor 50. The time processing unit, 94, generates TPU signals on bus line TP, line 96, wherefrom the signal generating hardware, 98, constructs the control signals, CNVT★, INTEG, and N INTEG, and the gating signals, A gate, B gate, and C gate.

Figure 4:
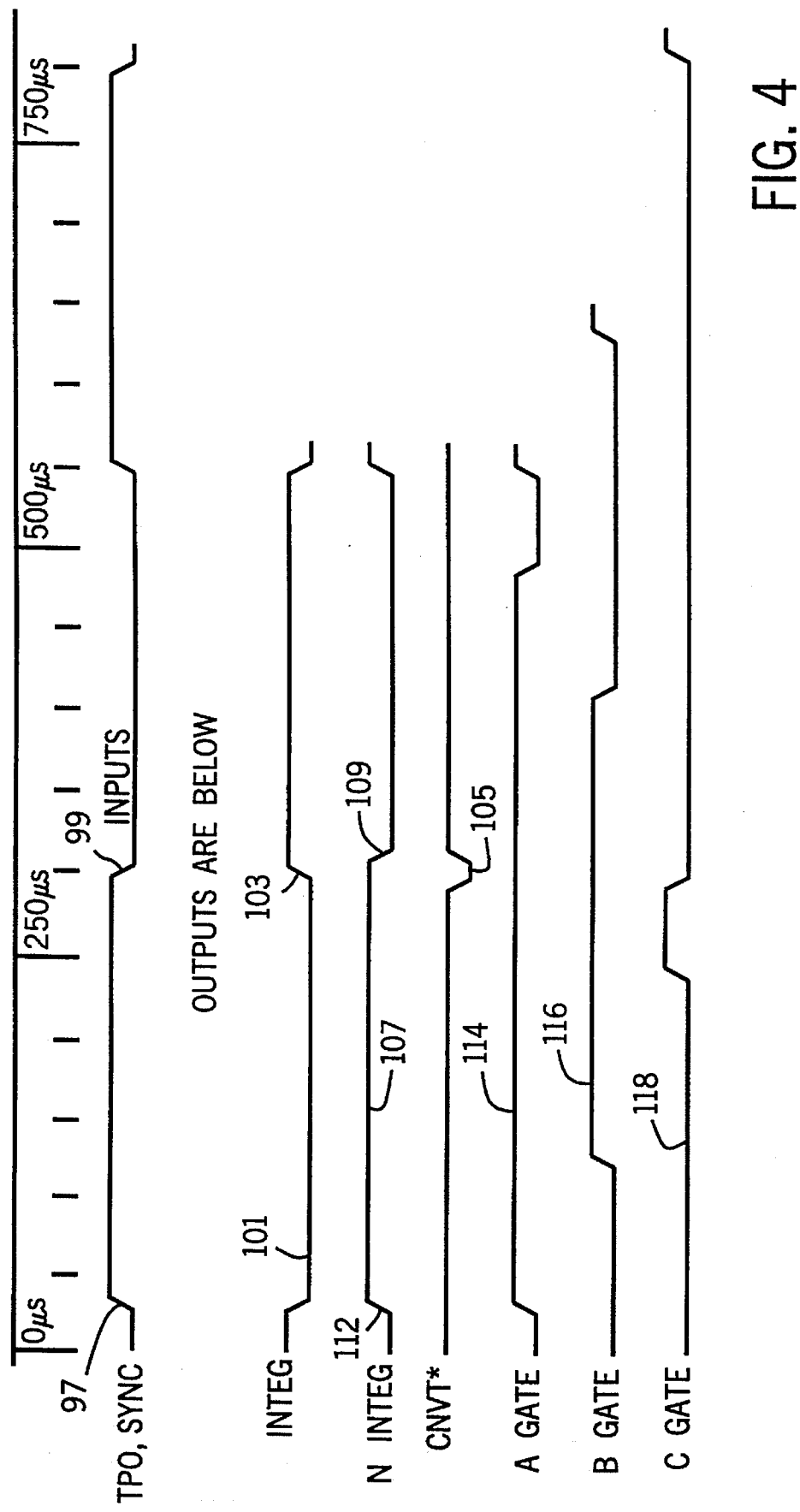
FIG. 4 is a timing diagram showing the input and output signals associated with the signal generating hardware of FIG. 3.

Referring to FIG. 4, the sync signal, TP0, defines on its rising edge, 97, the beginning of a carrier cycle, and on its falling edge, 99, the half point of the carrier cycle. On rising edge 97 of sync signal, TP0, the integrator signal, INTEG, 101, goes low. The integrator signal INTEG, 101, is sent by the waveform generator 14 to line 34 connected to pin 1 of switch U6A and to line 39 connected to pin 9 of switch U6C, FIG. 2a. A low at pin 1 of switch U6A and at pin 9 of switch U6C causes switches U6A and U6C, respectively, to close. With switches U6A and U6C closed, FIG. 2a, integrators U7A and U7B integrate the phase currents, Ibp and Icp, respectively.

On falling edge, 97, of the sync signal, TP0, the integrator signal, INTEG, 101, goes high. At rising edge 103, the integrator signal, INTEG, 101, opens switches U6A and U6C, FIG. 2a. With switches U6A and U6C open, the values at pin 1 of integrator U7A and at pin 7 of integrator U7B remain constant. With the values at pin 1 of integrator U7A and at pin 7 of U7B being constant, a sample signal, CNVT★, 105, is sent to pin 5 of analog to digital converter U9, FIG. 2b. The sample signal, CNVT★, is concurrent with the falling edge, 99, of the sync signal, TP0.

When the analog to digital. converter, U9, completes converting the analog inputs at pins 1, 2 and 28 to the digital outputs at pins 10–13, 15–22 of analog to digital converter U9, the reset signal, N INTEG, 107, goes low, as shown by falling edge 109. The reset signal, N INTEG, 107, is sent from the waveform generator 14, to line 36 connected to pin 8 of switch U6B and to line 44 connected to pin 16 of switch U6D. When the reset signal, N INTEG, line 107, goes low, switches U6B and U6D close, thereby resetting integrators U7A and U7B so that the outputs at pin 1 of integrator U7A and at pin 7 of integrator U7B are cleared. The outputs at pin 1 of integrator U7A and at pin 7 of integrator U7B remain clear until the reset signal, N INTEG, 107, goes high, thereby opening switches U6B and U6D. The rising edge 112 of reset signal, N INTEG, 107, coincides with the rising edge, 97, of the sync signal, TP0.

Typical gating signals, A gate, B gate, and C gate, 114, 116, 118, respectively, are shown. The gating signals, A gate, B gate, and C gate are derived from the time processing signals, lines TP0–TP11, as is known. Lines 102, 104 and 106, FIG. 1, transmit the gating signals, A gate, B gate and C gate, from the waveform generator 14 to the inverter 11.

It can be seen from the above description that various alternative embodiments are possible without departing from the spirit of the invention.

I claim:

1. In an AC drive having an inverter providing three-phase current and voltage to an induction motor in response to switching signals from a waveform generator to the inverter, the current and voltage having a predetermined frequency and period, a digital current regulator comprising:

a sensor for sensing two of the three phase currents and providing the same as a first sensed current and a second sensed current;

means for generating a first sensed digital current signal and a second sensed digital current signal functionally related to the first sensed current and the second sensed current in a stationary reference frame;

means for converting the first sensed digital current signal and the second sensed digital current signal into a waveform angle signal and a waveform modulation constant signal in a synchronous reference frame; and means for generating switching signals from the waveform generator to the inverter in response to the waveform angle signal and the waveform modulation constant signal.

2. The device of claim 1 wherein the means for generating the first sensed digital current signal and the second sensed digital current signal comprises:

a sample signal;

means for determining the average value of each of the sensed currents over a predetermined time period and providing the same as a first average sensed current and a second average sensed current; and an analog to digital converter connected to receive the first average sensed current and the second average sensed current, the analog to digital converter converting the first average sensed current into the first sensed digital current signal and converting the second sensed average current into the second sensed digital current signal in response to the sample signal.

3. The device of claim 2 wherein the means for determining the average value of the first sensed current and the average value of the second sensed current comprises:

a first integrator for integrating the first sensed current over a predetermined time period, the predetermined time period defined by a first integrate signal generated by the waveform generator and a hold signal generated by the waveform generator; and a second integrator for integrating the second sensed current over a second, predetermined time period, the second predetermined time period defined by the first integrate signal generated by the waveform generator and the hold signal generated by the waveform generator.

4. The device of claim 3, further comprising:

means for resetting the first integrator and the second integrator.

5. The device of claim 4 wherein the means for resetting the first integrator and the second integrator comprises a reset signal generated by the waveform generator.

6. In an AC drive having an inverter providing three-phase current and voltage to an induction motor in response to switching signals from a waveform generator to the inverter, a method of controlling the current, comprising:

sensing the voltage from the inverter to the motor and providing the same as a bus voltage;

providing a quadrature axis current reference signal and a direct axis current reference signal;

generating a quadrature axis current signal and a direct axis current signal;

generating a quadrature axis voltage signal in response to the quadrature axis current reference signal, and the quadrature axis current signal;

generating a direct axis voltage signal in response to the direct axis current reference signal and the direct axis current signal;

generating a voltage magnitude signal and a voltage magnitude angle signal by converting the quadrature axis voltage signal and the direct axis voltage signal from rectangular coordinates to polar coordinates;

determining the ratio of the voltage magnitude signal to the bus voltage and providing the same as a waveform modulation constant;

providing a reference frame angle signal;

summing the reference frame angle signal and the voltage magnitude angle signal and providing the sum as a waveform angle; and generating switching signals from the waveform generator to the inverter in response to the waveform angle and the waveform magnitude constant.

7. The method of claim 6 wherein generating the quadrature axis current signal and the direct axis current signal comprises the further steps of:

sensing two of the three phase currents and providing the same as a first analog current signal and a second analog current signal;

providing an activate signal;

determining an average value of the first analog current signal over a first, predetermined time period in response to the activate signal, and providing same as the average first analog current signal;

determining an average value of the second analog current signal over a second, predetermined time period in response to the activate signal, and providing same as the average second analog current signal;

generating a sample signal;

converting the average first analog current signal to a digital first current signal in response to the sample signal;

converting the average second analog current signal to a digital second current signal in response to the sample signal; and generating the quadrature axis current signal and the direct axis current signal in response to the digital first current signal, the digital second current signal, and the reference frame angle signal.

8. The method of claim 7 wherein the activate signal is provided by the waveform generator in response to the waveform angle and the waveform magnitude constant.

9. The method of claim 7 wherein the sample signal is generated by the waveform generator in response to the waveform angle and the waveform modulation constant.

10. The device of claim 7 wherein the average first analog current signal is determined by integrating the first analog current signal over a predetermined time period.

11. The method of claim 10 wherein the average second analog current signal is determined by integrating the second analog current signal over a predetermined time period.

12. The method of claim 11 wherein the first predetermined time period and the second predetermined time period are equal.

13. In an AC drive having an inverter which supplies three-phase voltage and current to an induction motor in response to switching signals from a waveform generator to the inverter, a method for regulating the current, comprising:

sensing the voltage supplied from the inverter to the induction motor and providing the same as a bus voltage;

generating a first digital sensed current signal and a second digital sensed current signal;

providing a reference frame angle signal;

generating a quadrature axis current signal and a direct axis current signal in response to the first digital sensed current signal, the second digital sensed current signal and the reference frame angle;

providing a quadrature axis current reference signal;

providing a direct axis current reference signal;

generating a quadrature axis voltage signal in response to the quadrature axis current signal and the quadrature axis current reference signal;

generating a direct axis voltage signal in response to the direct axis current signal and the direct axis current reference signal;

generating a waveform modulation constant signal and a waveform angle signal in response to the quadrature axis voltage signal, the direct axis voltage signal and the reference frame angle signal; and generating switching signals for the inverter in response to the waveform angle signal and the waveform modulation constant signal.

14. The method of claim 13 wherein generating the waveform modulation constant signal and the waveform angle singal comprises the additional steps of:

converting the quadrature axis voltage signal and the direct axis voltage signal into a voltage magnitude signal and a voltage magnitude angle signal;

dividing the voltage magnitude signal by the bus voltage to provide a waveform modulation constant signal; and summing the voltage magnitude angle signal and the reference frame angle signal to provide a waveform angle signal.

15. The method of claim 13 wherein generating the first digital sensed current signal and the second digital sensed current signal comprises the further steps of:

sensing two of the three phase currents and providing the same as a first analog sensed current signal and a second analog sensed current signal;

generating an integrate signal;

integrating the first analog sensed current signal over a first predetermined period in response to the integrate signal;

integrating the second analog sensed current signal over a second predetermined period in response to the integrate signal;

generating a sample signal;

converting the first analog sensed current signal to a first digital sensed current signal in response to the sample signal; and converting the second analog sensed current signal to a second digital sensed current signal in response to the sample signal.

16. The method of claim 15 wherein the integrate signal is generated in response to the waveform angle signal and the waveform modulation constant signal.

17. The method of claim 15 wherein the sample signal is generated in response to the waveform angle signal and the waveform modulation constant signal.

18. The method of claim 15 wherein the first analog sensed current signal is integrated by an integrator.

19. The method of claim 18 wherein the second analog sensed current signal is integrated by a second integrator.

20. The method of claim 19 further comprising the additional steps of:

providing a reset signal; and resetting the first integrator and the second integrator in response to the reset signal.

21. The method of claim 13 wherein the quadrature axis current signal and the direct axis current signal are generated by a reference frame converter.

22. The method of claim 13 wherein the quadrature axis voltage signal is generated by a proportional-integral-derivative regulator, the proportional-integral-derivative regulator having a proportional gain, an integral gain, and a derivative gain.

23. The method of claim 14 further comprising the additional steps of:

calculating the optimal regulator gain; and providing the same as the proportional gain of the proportional-integral-derivative regulator.

24. The method of claim 13 wherein the direct axis voltage signal is generated by a proportional-integral-derivative regulator, the proportional-integral-derivative regulator having a proportional gain, an integral gain and a derivative gain.

25. The method of claim 24 further comprising calculating an optimal regulator gain and providing the same as the proportional gain of the proportional-integral-derivative regulator.

26. The method of claim 14 further comprising the additional steps of:

providing a predetermined limit to the waveform modulation constant; and adjusting the voltage magnitude signal in response to the predetermined limit of the waveform modulation constant.

27. The method of claim 14 wherein the quadrature axis voltage signal is generated by a proportional-integral-derivative regulator and the direct axis voltage signal is generated by a second proportional-integral-derivative regulator.

28. The method of claim 27 further comprising the additional steps of:

providing a predetermined limited waveform modulation constant; and adjusting the voltage magnitude signal in response to the predetermined limit of the waveform modulation constant.

29. The method of claim 28 wherein each proportional-integral-derivative regulator includes an integrator.

30. The method of claim 29, wherein the voltage magnitude signal is adjusted by clamping the integrator of the first proportional-integral-derivative regulator and the integrator of the second proportional-integral-derivative regulator so as to vary the voltage magnitude signal while maintaining the voltage magnitude angle signal substantially constant.

* * * * *